United States Patent [19]
Müller

[11] 3,985,378
[45] Oct. 12, 1976

[54] FLEXIBLE COUPLING

[75] Inventor: Bernd Müller, Worms, Germany

[73] Assignee: Klein, Schanzlin & Becker Aktiengesellschaft, Frankenthal, Pfalz, Germany

[22] Filed: May 14, 1975

[21] Appl. No.: 577,425

[30] Foreign Application Priority Data
May 17, 1974   Germany............................ 2424004

[52] U.S. Cl................................ 285/49; 285/114; 285/229
[51] Int. Cl.² ........................................ F16L 51/02
[58] Field of Search ................ 285/49, 50, 48, 229, 285/228, 114, 226; 403/50, 51; 64/27 NM, 11 R

[56] References Cited
UNITED STATES PATENTS

| | | | |
|---|---|---|---|
| 2,267,085 | 12/1941 | Dezendorf............................ | 285/49 |
| 2,504,634 | 4/1950 | Boschi .................................. | 285/49 |
| 3,552,776 | 1/1971 | Leymann ........................ | 285/229 X |
| 3,566,510 | 3/1971 | Wendt ............................... | 285/49 X |
| 3,666,296 | 5/1972 | Fischetti .......................... | 285/114 X |

FOREIGN PATENTS OR APPLICATIONS

| | | | |
|---|---|---|---|
| 101,531 | 7/1937 | Australia............................... | 285/50 |
| 57,650 | 10/1924 | Sweden................................ | 285/50 |

*Primary Examiner*—Thomas F. Callaghan
*Attorney, Agent, or Firm*—Michael J. Striker

[57] ABSTRACT

A sound-absorbent and/or vibration-damping flexible pipe coupling wherein the end portions of an elastic compensator hose are secured to spaced-apart flanges which can be bolted to the flanges of pipes or analogous conduits for a fluid. The hose is surrounded by two pressure-transmitting rings one of which is nearer to the one and the other of which is nearer to the other flange. The rings have openings for fasteners including a first set of fasteners which secure, without contacting the other ring, the one ring to the other flange and a second set of fasteners which secure, without contacting the one ring, the other ring to the one flange. A sound-absorbent and/or vibration-damping cushion is interposed between and secured to the rings. The cushion, which is compressed by the two rings when the distance between the flanges increases, may consist of a single rubber ring, of several cylindrical rubber-metal inserts, or of several metallic coil springs.

10 Claims, 5 Drawing Figures

FLEXIBLE COUPLING

BACKGROUND OF THE INVENTION

The present invention relates to flexible couplings in general, especially to flexible pipe couplings, and more particularly to improvements in flexible couplings wherein an elastic component (e.g., a rubber hose, also known as compensator) is connected to and extends between two flanges serving to secure the flexible coupling to sections of a pipe line or the like.

It is known to utilize in a flexible coupling a rubber hose whose ends are connected with metallic hubs or flanges. The hose is relatively thin so that it can readily expand lengthwise in order to compensate for increasing distance between two sections of a pipe line which flank the coupling. If the pipe line conveys a highly pressurized fluid, the fluid acts against the internal surface of the hose and tends to move the adjacent sections of the pipe line nearer to each other. If the hose has a bulge, pressurized fluid acts against the internal surfaces which flank the bulge and tends to move the adjacent sections of the pipe line away from each other. Such movements of the sections are prevented by resorting to elastic and/or rigid fastening means which secure the sections to the ground, floor, ceiling or a rigid frame member. The provision of such fastening means contributes significantly to the initial and maintenance cost of the pipe line.

It was further proposed to use the just described conventional flexible pipe coupling in conjunction with devices which engage the ends of nearest pipe line sections adjacent to the respective ends of the compensator and oppose axial stretching of the compensator. Such devices operate satisfactorily if the transmission of sound between the sections which flank the flexible coupling is of no consequence. However, the just mentioned devices are overly complex and expensive if they must be designed with a view to prevent or reduce the transfer of sound between the sections of pipe at the opposite sides of the flexible coupling.

It was further proposed to connect the flanges which are secured to the ends of the compensator by sound-absorbing connecting elements. Such elements include clamps in the form of yokes made of flat or profiled steel and secured to the flanges by bolts, screws or the like. The sound-absorbing characteristics are imparted by coating one or both sides of each clamp with rubber. The maximum permissible number of such clamps is relatively small due to space limitations and their useful life is short, especially if the flexible coupling is to take up substantial stresses. This is attributed to the fact that relatively thin coats of rubber on the clamps cannot stand substantial compressive and/or other stresses. Therefore, such clamps are used only in conjunction with flexible couplings which are expected to be subjected to relatively low stresses. This greatly reduces the utility of such couplings since a flexible coupling is often required to stand extremely high fluid pressures and/or other stresses which must be taken up by the compensator. Moreover, the compensator is not properly shielded against mechanical impacts or other influences which could result in puncturing and/or other damage thereto.

A further drawback of presently known flexible pipe couplings is that they must be assembled at the locale of use. Thus, the replacement of the damaged coupling with a new coupling takes up a substantial amount of time, first because the damaged coupling cannot be removed as a self-contained unit and secondly because the new coupling must be put together upon removal of the old coupling. The assembly of flexible couplings at the locale of use is undesirable on the additional ground that proper assembly depends to a large extent on the ability of workmen and also that it is not possible to insure that each of a series of flexible couplings will be assembled with a requisite degree of reproducibility, especially as concerns the connections between the compensator and the flanges or hubs, the initial positions of flanges or hubs relative to each other, and/or the distribution and mounting of rubber-coated clamps. The situation is aggravated when the flexible coupling must be inserted between two misaligned or angularly offset pipes; improper mounting of the coupling under such circumstances is likely to result in premature destruction of the compensator. Also, improper mounting of the compensator reduces its ability to prevent or reduce the transfer of sound and/or vibrations. As a rule, a flexible pipe coupling which is installed in a pipe line for water should reduce or eliminate noise which is being propagated by the conveyed fluid.

SUMMARY OF THE INVENTION

An object of the invention is to provide a novel and improved flexible coupling, particularly a flexible pipe coupling, which can stand long periods of use, wherein the sensitive parts are protected by more resistant parts, which can be designed to exhibit highly satisfactory sound-absorbing and/or vibration-damping characteristics, and which can be fully assembled in the manufacturing plant so that its installation in a pipe line or the like at the locale of use takes up a minimum of time.

Another object of the invention is to provide a flexible pipe coupling of the above outlined character wherein the elastic compensator is shielded at both ends and from the outside so that it can be stressed only by the conveyed fluid and/or in response to misalignment of the parts which connect it to the sections of a pipe line, and wherein the stressing of compensator owing to misalignment of the just mentioned parts is reduced in a novel and improved way.

A further object of the invention is to provide a flexible pipe coupling which is sufficiently rugged to be capable of replacing one or more conventional rigid supports for the sections of a pipe line in which the coupling is put to use.

The invention is embodied in a flexible coupling, particularly in a flexible pipe coupling, which comprises spaced-apart first and second flanges which may be made of metal or another rigid material and each of which can be bolted or screwed to the flange of a pipe or conduit in a pipe line for a hydraulic or gaseous fluid, a flexible sound-absorbing compensator (e.g., a rubber hose) disposed between and having preferably beaded first and second end portions respectively bonded to, anchored in or otherwise secured to the first and second flanges, spaced-apart and second ring-shaped pressure-transmitting elements (e.g., flat metallic rings) surrounding the compensator intermediate the flanges and being respectively adjacent to but normally or permanently out of bodily contact with the first and second flanges, first and second fastener means (each of which may comprise several externally threaded metallic posts and nuts) which respectively secure the first and second pressure-transmitting elements only to the second and first flanges (i.e., the first fastener means does not contact the second pressure-transmitting element and the first flange and the second fastener means does not contact the first pressure-transmitting element and the second flange), and elastic cushioning means interposed between the pressure-transmitting elements.

The cushioning means is compressed by the pressure-transmitting elements in response to movement of at least one of the flanges away from the other flange. The cushioning means is preferably secured to both pressure-transmitting elements so that it can be stressed, at least in part, in response to other movement or movements (such as tilting or lateral shifting) of one flange relative to the other flange and/or vice versa.

The cushioning means may comprise metal-rubber inserts which can prevent the transfer of sound between the pressure-transmitting elements, a rubber ring which can be used for the same purpose, or a set of metallic springs. Such springs are capable of reducing or preventing the transfer of vibrations between the pressure-transmitting elements.

The novel features which are considered as characteristic of the invention are set forth in particular in the appended claims. The improved flexible coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
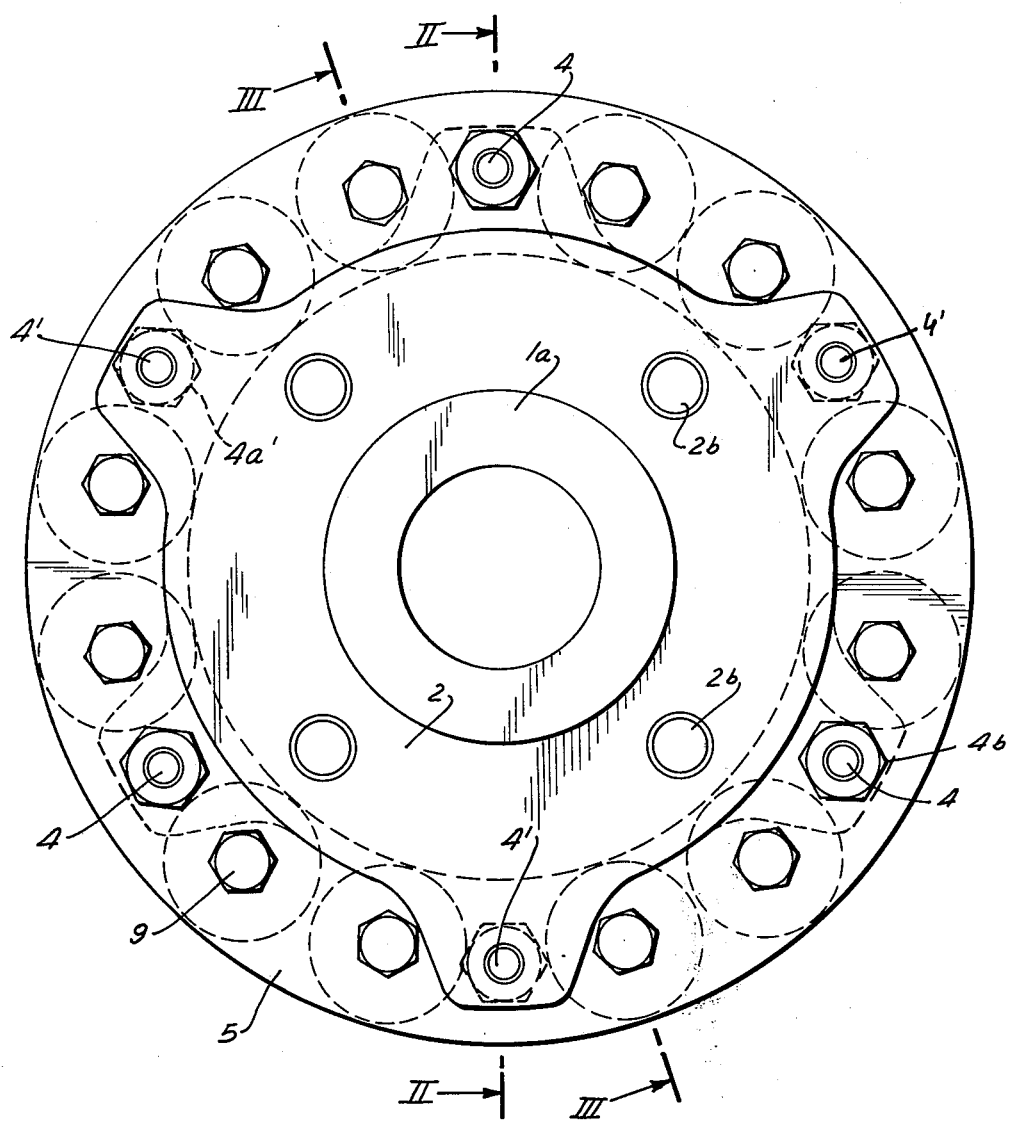
FIG. 1 is an end elevational view of a flexible pipe coupling which embodies one form of the invention.
Figures 2, 4:
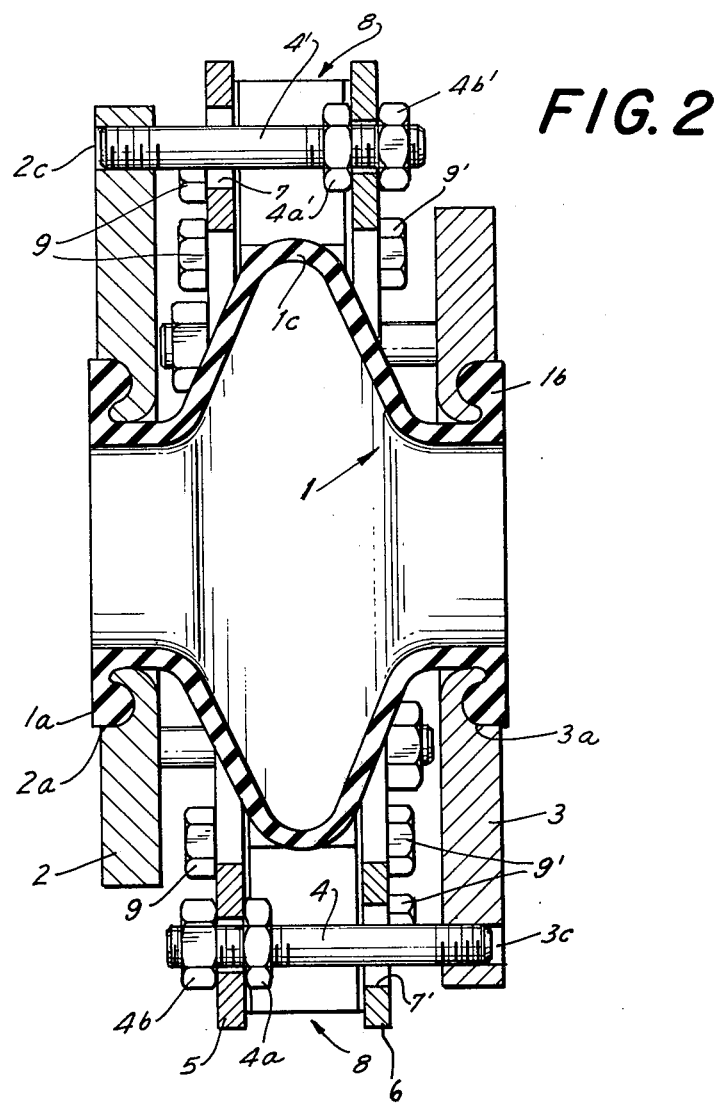
FIG. 2 is a sectional view as seen in the direction of arrows from the line II—II of FIG. 1.
FIG. 4 is a side elevational view of modified cushioning means which can be used in the flexible coupling of FIGS. 1–3.
Figure 3:
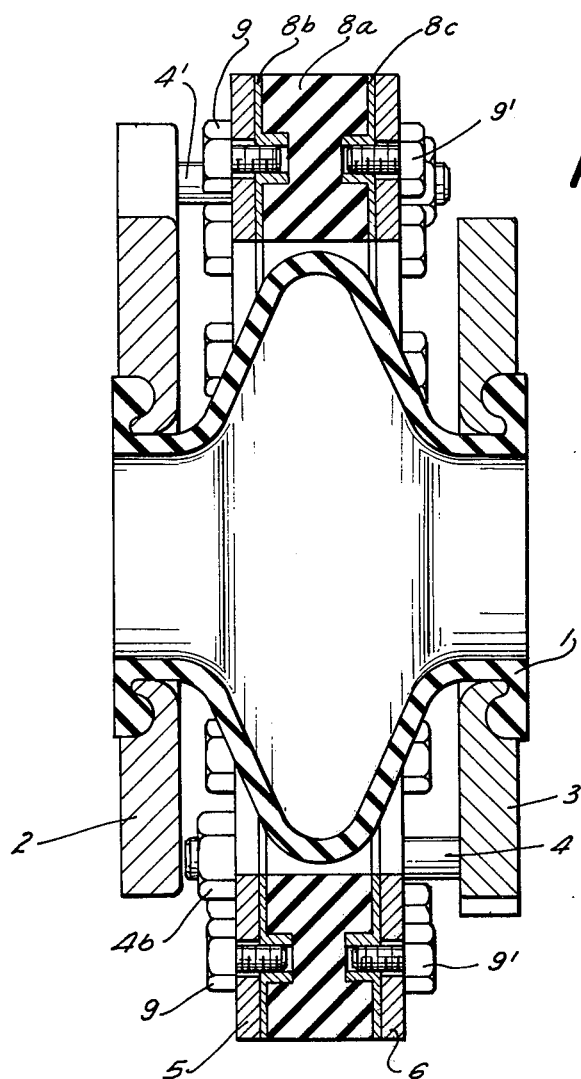
FIG. 3 is a sectional view as seen in the direction of arrows from the line III—III of FIG. 1.

Referring first to FIGS. 1 to 3, there is shown a flexible pipe coupling which comprises two normally coaxial spaced-apart metallic flanges 2, 3 connected to the beaded end portions 1a, 1b of a flexible sound-absorbing compensator here shown as an elastic hose having an outwardly extending median bulge 1c disposed between two pressure-transmitting metallic rings 5, 6. The outer sides of the flanges 2, 3 are formed with sockets 2a, 3a for the respective end portions 1a, 1b of the compensator 1. The flanges are further formed with holes (see the holes 2b of the flange 2 shown in FIG. 1) for the shanks of screws or bolts (not shown) which can secure these flanges to the flanges of metallic pipes or other types of conduits for a gaseous or liquid medium. The compensator 1 may consist of rubber or a synthetic plastic material having similar elastomeric and sound-absorbing properties.

The ring 5 is nearer to but normally out of contact with the flange 2, and the ring 6 is nearer to but normally out of contact with the flange 3. These rings respectively have equally spaced openings or holes 7, 7' and the holes 7 are offset with respect to the holes 7', as considered in the circumferential direction of the rings. The holes 7' receive with clearance the shanks of metallic posts 4 which, together with associated pairs of metallic nuts 4a, 4b, constitute fastener means for rigidly securing the ring 5 only to the flange 3. To this end, each post 4 has an externally threaded first end portion which extends into a tapped bore 3c of the flange 3 and an externally threaded second end portion which takes the respective nuts 4a, 4b. The nuts 4a, 4b engage the ring 5 from opposite sides. As shown in FIG. 1, the fastener means between the flange 3 and ring 5 comprises three posts 4. The fastener means which rigidly secures the ring 6 only to the flange 2 comprises three externally threaded posts 4' which are screwed into tapped bores 2c of the flange 2 and extend with clearance through the respective openings 7, and three pairs of nuts 4a', 4b'.

The flexible coupling further comprises cushioning means which is interposed between the pressure-transmitting rings 5, 6 and comprises twelve equally spaced cylindrical inserts 8 each secured to the ring 5 by a screw 9 and to the ring 6 by a screw 9'. As shown in FIG. 3, each insert 8 comprises an elastomeric median portion 8a consisting of rubber or the like, a first metallic end plate 8b which is bonded to one end of the median portion 8a and has a tapped recess for the shank of the respective screw 9, and a second metallic end plate 8c which is bonded to the other end of the median portion 8a and has a tapped recess for the shank of the respective screw 9'. The cushioning means including the inserts 8 prevents the transmission of sound from the ring 5 to the ring 6 or vice versa. Consequently, and since the ring 5 is connected only with the flange 3, the ring 6 is connected only with the flange 2, and the flanges 2, 3 are directly connected to each other only by the compensator 1, the entire flexible coupling is capable of preventing or greatly reducing the transmission of sound from the pipe or conduit which is connected to the flange 2 to the pipe or conduit which is connected to the flange 3, or vice versa.

When the flange 2 tends to move or actually moves away from the flanges 3 and/or vice versa, the rings 5, 6 bear against and compress the cushioning means including the inserts 8. This is due to the fact that, when the distance between the flanges 2, 3 increases, the distance between the rings 5, 6 decreases with attendant stressing of elastic median portion 8a because the rings 5, 6 are respectively rigid with the flanges 3, 2. By undergoing compression and by resisting such compression with a progressively increasing force, the inserts 8 relieve the compensator 1 in response to movement of the flange 2 away from the flange 3 or vice versa. Certain inserts 8 will undergo compression if the flange 2 is tilted relative to the flange 3 or vice versa, and the inserts 8 will also undergo at least some deformation if the flexible coupling is stressed in such a way that the flange 2 tends to move in parallelism with the flange 3 and/or vice versa. The beaded end portions 1a, 2a may but need not be bonded to the respective flanges.

Since the end portions 1a, 1b of the compensator 1 are anchored in the flanges 2, 3, and since the compensator is surrounded by the pressure-transmitting rings 5, 6, posts 4, 4' and inserts 8, the compensator is fully protected against damage from without. The entire flexible coupling can be assembled at the manufacturing plant and shipped to the locale of use in fully assembled condition. Such coupling can be used as a highly satisfactory flexible pipe coupling but it is also possible to use it as a shaft coupling, especially if the flange 2 or 3 need not transmit to the flange 3 or 2 a substantial torque. If the coupling is a shaft coupling, the flanges may constitute solid disks without central apertures and the tubular compensator 1 may be replaced with a solid flexible and/or elastic rod-like or bar-like compensator.

The improved flexible coupling can be used with advantage for mounting of valves, pumps and/or hydraulic motors in pipe lines in such a way that the transmission of sound and/or vibrations from such aggregates to the pipe line or vice versa is negligible. For example, a hydraulic pump can be mounted in a pipe line between two flexible pipe couplings which embody the invention. The improved flexible coupling is strong enough to properly support a pump or the like (either alone or with a similar second flexible coupling) without resorting to additional means for securing the pump to the components of the pipe line.

The improved flexible coupling will operate properly and the parts 5, 6, 4, 4' and 8 will protect the compensator 1 against excessive stressing even if the flanges 2, 3 are well out of exact axial alignment and/or exact parallelism with each other. Thus, the compensator can stand long periods of use because, as the stresses upon the one and/or the other flange increase (i.e., as the flange 2 tends to move out of alignment with the flange 3 and/or vice versa, for example, due to improper laying of sections of the pipe line and/or due to changing pressure of fluid which is conveyed by the pipe line), the resistance to further stressing of the inserts 8 increases and such inserts take up at least some stresses which, in their absence, would have to be taken up by the compensator alone. The entire flexible coupling is compact and consists of a relatively small number of simple parts. Such coupling can be completely assembled and packed or crated for storage in a small area preparatory to shipment to customers or dealers. The fluid coupling can be used alone, i.e., as a means for compensating for initial and/or later developing misalignment of sections of a pipe line, or in the aforedescribed manner for mounting between the sections of a pipe line on the one hand and a valve, a block of valves, a motor-pump assembly or a hydraulic motor on the other hand.

A further important advantage of the improved flexible coupling is that, especially if the portions 8a of the inserts 8 are directly bonded to the rings 5, 6, the area of contact between the portions 8a and the rings 5, 6 increases with increasing stressing of the cushioning means, i.e., with decreasing distance between the rings 5, 6. The number of portions 8a will be selected in such a way that such portions can readily withstand the maximum forces which develop when the flexible coupling is in use, i.e., the maximum stresses which are expected to act on the flanges 2, 3 in order to move these flanges apart and/or out of alignment with each other. The overall number of inserts 8 (FIG. 1 shows that the flexible coupling comprises twelve equally spaced inserts) can be reduced or increased, depending on the diameter of the coupling, on the anticipated magnitude of stresses, on the material of the inserts and/or on the diameters of inserts.

FIG. 4 shows a modified cushioning means 108 which is an elastic ring made of rubber or the like and which can be used as a substitute for the inserts 8 of FIGS. 1–3. This ring has notches 108g for the posts 4, 4' (not shown). If desired the ring 108 can be bonded to two metallic plates having tapped recesses for screws 9, 9' or analogous means which secures the ring 108 to the pressure-transmitting elements 5, 6. However, it is equally possible to simply clamp the ring 108 between the rings 5, 6 during assembly of the flexible coupling. The ring 108 cannot leave the space between the rings 5, 6 because it surrounds the posts 4 and 4'. A flexible coupling which embodies the ring 108 is also a very satisfactory sound suppressing device. The configuration of the ring 108 can be selected in such a way that it exhibits a progressive spring characteristic. Such progressive behavior of the ring 108 insures that the flexible coupling will exhibit highly satisfactory sound absorbing characteristics throughout the entire pressure range of fluids which stress the compensator.

Figure 5:
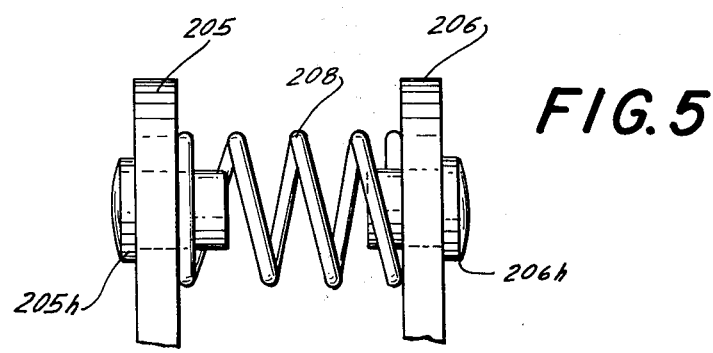
FIG. 5 is a fragmentary side elevational view of a flexible coupling having metallic cushioning means.

If the improved flexible coupling is to prevent the transmission of vibrations between the two flanges, the cushioning means is preferably assembled of metallic coil springs 208 one of which is shown in FIG. 5 between two pressure-transmitting rings 205, 206 corresponding to the rings 5, 6 of FIGS. 1–3. The rings 5, 6 carry studs 205h which center the respective end convolutions of the springs 208. A flexible coupling which embodies the flexible elastic compensator 1 of FIGS. 1–3 and cushioning means including metallic springs 208 is a highly satisfactory insulator of sound and is further capable of preventing the transmission of vibrations between the two flanges.

Without further analysis, the foregoing will so fully reveal the gist of the present invention that others can, by applying current knowledge, readily adapt it for various applications without omitting features which fairly constitute essential characteristics of the generic and specific aspects of my contributions to the art and, therefore such adaptations should and are intended to be comprehended within the meaning and range of equivalence of the claims.

What is claimed as new and desired to be protected by Letters Patent is set forth in the appended claims.

I claim:

1. A flexible coupling, particularly a pipe coupling, comprising a spaced-apart first and second flanges; a flexible sound-absorbing compensator disposed between and having first and second end portions respectively secured to said first and second flanges; axially spaced-apart first and second ring-shaped pressure-transmitting elements surrounding said compensator and being respectively adjacent to but normally out of bodily contact with said first and second flanges; first fastener means rigidly securing said first pressure-transmitting element only to said second flange axially spaced from and movable with said second flange and second fastener means rigidly securing said second pressure transmitting element only to the said first flange axially spaced from and movable with said first flange and elastic cushioning means interposed between said pressure-transmitting elements, said cushioning means being compressed by said pressure-transmitting elements in response to movement of at least one of said flanges away from the other of said flanges which results in concomitant movement of said pressure-transmitting elements axially towards one another.

2. A coupling as defined in claim 1, further comprising means for securing said cushioning means to said pressure-transmitting elements.

3. The coupling as defined in claim 1, wherein said compensator is an elastic hose.

4. A coupling as defined in claim 1, wherein said first and second pressure-transmitting elements respectively have first and second openings, said first openings being offset with respect to said second openings, as considered in the circumferential direction of said elements and said first and second fastener means respectively extending with clearance through said second and first openings.

5. A coupling as defined in claim 1, wherein said cushioning means comprises a circumferentially complete rubber ring.

6. A coupling as defined in claim 1, wherein said cushioning means comprises a plurality of metallic springs.

7. A coupling as defined in claim 1, wherein said cushioning means prevents the transmission of sound between said pressure-transmitting elements.

8. A coupling as defined in claim 1, wherein said end portions of said compensator comprise annular beads received in complementary sockets of the respective flanges.

9. A coupling as defined in claim 1, wherein said compensator has an outwardly bulging annular median portion disposed at least in part between said pressure-transmitting elements.

10. A coupling as defined in claim 1, wherein said flanges, said pressure-transmitting elements, said fastener means and at least a portion of said cushioning means consist of a metallic material.

* * * * *